United States Patent [19]

Graner et al.

[11] Patent Number: 4,976,405

[45] Date of Patent: Dec. 11, 1990

[54] ELECTROMAGNETICALLY ACTUATABLE VALVE

[75] Inventors: Juergen Graner, Ludwigsburg; Marcel Kirchner, Stuttgart; Hans Kubach, Korntal-Muenchingen, all of Fed. Rep. of Germany

[73] Assignee: Robert Bosch GmbH, Stuttgart, Fed. Rep. of Germany

[21] Appl. No.: 485,906

[22] Filed: Feb. 28, 1990

[30] Foreign Application Priority Data

Mar. 25, 1989 [DE] Fed. Rep. of Germany ....... 3909893

[51] Int. Cl.[5] .......................... F16K 31/06; B05B 1/32

[52] U.S. Cl. .......................... 251/129.16; 251/129.22; 239/585

[58] Field of Search ...................... 251/129.16, 129.22; 239/585

[56] References Cited

U.S. PATENT DOCUMENTS 4,546,339 10/1985 Kubach .

4,666,087 5/1987 Jaggle et al. .

4,778,112 10/1988 De Concini et al. ...... 251/129.16 X

*Primary Examiner*—Arnold Rosenthal

*Attorney, Agent, or Firm*—Edwin E. Greigg

[57] ABSTRACT

An electromagnetically actuatable valve is proposed that serves in particular as a fuel injection valve for fuel injection systems of internal combustion engines. An armature cooperates with magnet poles, and a bearing cone the length of the generatrix of which is approximately equivalent to the diameter is machined into a valve seat body. The armature and valve seat body may also have bearing faces of calotte shape facing one another.

4 Claims, 7 Drawing Sheets

ELECTROMAGNETICALLY ACTUATABLE VALVE

BACKGROUND OF THE INVENTION

The invention is directed to improvements in electromagnetically actuatable valves.

An electromagnetically actuatable valve is already known from U.S. Pat. No. 4,666,087 in which a valve needle opening outward is supported in a guide bore and actuated in the opening direction counter to a valve needle spring by an armature. In this valve, not only does the friction of the motion of the valve needle lead to hysteresis errors in triggering the valve, but the electromagnet also requires high triggering power in actuating the valve needle, to overcome the force of the valve needle spring, and must therefore be made larger for this purpose. In addition, the valve needle in the guide bore is always guided by the valve needle it contacts the guide bore unilaterally, resulting in an uneven fuel stream emerging from the fuel injection valve, leading in turn to poorer fuel preparation and poorer uniformity of distribution to the various cylinders of the internal combustion engine. In response to this problem, a hydraulically centered system has been developed, but because of the friction and the unfavorable position of the centering forces, centering that is adequate for all requirements is attainable by the hydraulic orienting forces only with difficulty. Although the pressure drop of the hydraulic centering does stabilize the static quantity, this stabilization is not actually needed, the disadvantage being the lack of pressure for preparing the fuel predominates. In a system having a conical stop plus hydraulic centering, the centering of the conical stop is not adequate until the length of the system is relatively great in proportion to the sealing diameter. Especially in low-pressure single-point valves (having a large opening cross section), this means that the mass to be moved is large, making the valve vulnerable to transverse acceleration. Compensating for this by plastic deformation in the axial direction is made more difficult by the low spring rigidity, because of the great length.

OBJECT AND SUMMARY OF THE INVENTION

It is a principal object of the invention to provide an electromagnetically actuatable valve having the advantage over the prior art of improved centering of the moved elements that is fundamentally without play, because of the long cone.

It is another object of the invention that the stroke be also relatively easy to adjust.

It is still another object of the invention that the sealing cone and the calotte in the valve seat body can be machined in the same chuck from one side, and fuel distribution is improved substantially. Thus the goal of the invention is to obtain a technologically exact mechanical definition of the orienting stop of the opened position, find a good connection between the armature and the valve body, and adapt the system to a disk-shaped armature for concentric disposition of the actuating magnets. Through these objects this goal can be attained.

The invention will be better understood and further objects and advantages thereof will become more apparent from the ensuing detailed description of preferred embodiments taken in conjunction with the drawings.

DESCRIPTION OF THE PRIOR ART

Figure 1:
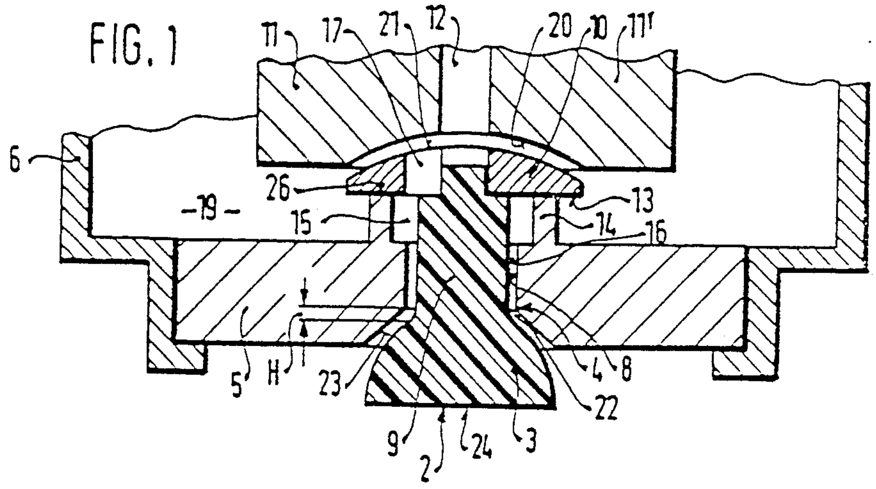
FIGS. 1 and 2 show the known prior art.

The fuel injection valve shown in a fragmentary view in FIG. 1 is electromagnetically actuated in a known manner by the excitation of a magnetic coil, not shown, and is used for instance as part of a fuel injection system to inject fuel, in particular at low pressure, into the air intake tube of mixture-compressing internal combustion engines having externally supplied ignition. The fuel injection valve has a movable valve element 2, which may be of nonmagnetic material such as brass, austenitic steel or other material, and has a sealing element 3 which cooperates with a valve seat 4 in a valve seat body 5 of nonmagnetic material. The valve seat body 5 is inserted into a valve housing 6. Upstream of the valve seat 4 in the valve seat body 5, a flow bore 8 is provided, through which a connecting part 9 of the valve element 2 protrudes. Remote from the sealing element 3, the connecting part 9 of the valve element 2 is firmly joined to an armature 10, for instance disk-shaped, of soft magnetic material. The magnetic circuit is formed by poles 11 and 11', serving as the core, and by the armature 10. The magnetic flux effected by the magnetic coil acts via the poles 11, 11'. Between the poles 11, 11', a central opening 12 is provided, by way of which fuel can flow from a fuel supply source (not shown) such as a fuel feed pump, into the interior of the fuel injection valve. During fuel pumping and with the magnetic coil excited, the armature 10 and thus the valve element 2 as well, because of the hydraulic pressure forces engaging the armature and the valve element, are moved away from the poles 11, 11', and the armature 10 strikes a stop face 13 remote from the poles 11, 11', on a raised annular stop 14 formed on the valve seat body 5. Between the annular stop 14 and the circumference of the connecting part 9, an annular cross section 15 is formed, discharging into an annular flow cross section 16 that is formed between the flow bore 8 and the connecting part 9 and that, for example, functions as a throttling and hence metering means. Discharging into the annular cross section 15 is at least one preferably axially extending flow opening 17, which penetrates the armature 10 and on the other end communicates with the interior 19 of the fuel injection valve or with the central opening 12 between the poles 11, 11'. The armature 10 and the poles 11, 11' face one another, and are preferably provided with complementally-formed spherical surfaces; for example, the poles 11, 11' have a concave surface 20 extending over both poles 11, 11', and the armature 10 is provided with a convex surface 21 aligned with the surface 20 of the poles 11, 11'. Because of the complementally-formed surfaces 20, 21, radial centering of the armature 10 with respect to the valve seat 4 takes place as a result of the magnetic forces. If the poles 11, 11' are free of magnetic tension, then the armature 10 and valve element 2, because of the pressure forces of the flowing fuel, are moved away from the poles 11, 11', so that the sealing element 3, lifting away from the valve seat 4, opens outwardly, and fuel can flow from the central opening 12 or from the interior 19 via the flow openings 17 to the annular cross section 15 and from there can flow out via the flow cross section 16 and the valve seat 4. The radial hydraulic forces engaging the connecting part 9 in the flow cross section 16 effect a radial centering of the valve element 2, so that the valve element is guided in the flow bore 8 by the fuel flow without touching the wall and thus without friction and is correspondingly seated, centered by the stop 13. Emerging via the valve seat 4 is a film of fuel of uniform thickness all the way around. An annular gap 22 which is disposed between the surface (for example of hemispherical or some other spherical shape) of the sealing element 3 and an injection port 23 adjoining the valve seat 4 in the valve seat body 5 in the flow direction. Through this annular gap this film flows to the outside with an increasing diameter at the surface of the sealing element 3 to mix with the ambient air, which after the rupture of the conically shaped fuel film upon reaching the sharp-edged end face 24 of the sealing element 3, likewise mixes with the fuel from the inside out. The stroke H of the valve element with respect to the valve seat 4 can on the one hand be affected by suitable machining of the end face 26 of the annular stop 14, either by removing material from this end face or deforming it in a desired manner. On the other hand, the valve element stroke H can also be adjusted by axial displacement of the armature 10 and valve element 2 with respect to one another.

Figure 2:
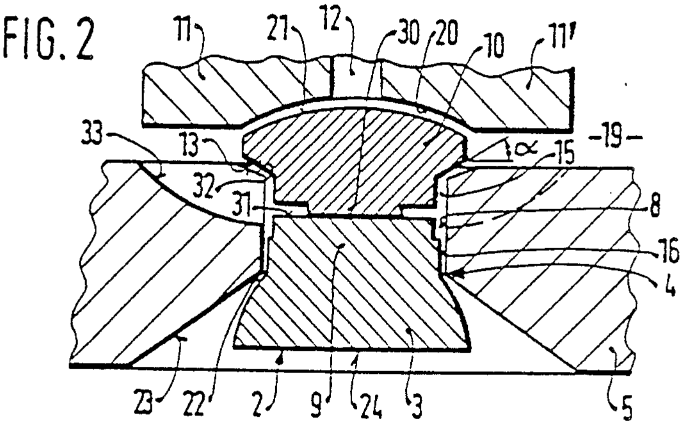

In the second example of the prior art shown in FIG. 2, elements that are the same as and function like those of the first example in FIG. 1 are identified by the same reference numeral. As in the first example of FIG. 1, a flow bore 8 that is penetrated by the connecting part 9 of the valve element 2 is provided in the valve seat body 5 of the second example shown in FIG. 2. Between the connecting part 9 and the flow bore 8, a flow cross section 16 is again formed, which can act as a throttle and hence serves as a metering cross section. The armature 10 has a tang 30, oriented toward the valve element 2, which in the vicinity of the annular cross section 15 is seated on the end 31 of the valve element 2 and may be butt-welded or soldered to that end. On the armature 10, remote from the poles 11, 11' and inclined at an angle alpha, a stop face 13 is formed that is provided, on the opposite side on the valve seat body 5, with an adapted conical stop bore 32, which merges with the flow bore 8. The angle alpha at the stop face 13 is larger than the angle of friction, but is flat enough that on the one hand a good stroke stop is assured, and on the other hand, in cooperation with the stop bore 32, good centering of the armature 10 and valve element 2 in the flow bore 8 and thus with respect to the valve seat 4 is also assured. Advantageously, there is a difference between the angle alpha of the stop face 13 and the inclination of the stop bore 32, or the stop bore 32 is rounded toward the interior 19. Fuel conduits 33 are formed in the valve seat body 5 that lead from the interior 19 to the annular cross section 15, in which a circular symmetrical distribution of the fuel with respect to the flow cross section 16 takes place. Stroke compensation can be accomplished by means of plastic deformation of the tang 30.

DESCRIPTION OF THE PREFERRED EMBODIMENTS OF THE INVENTION

Figure 3:
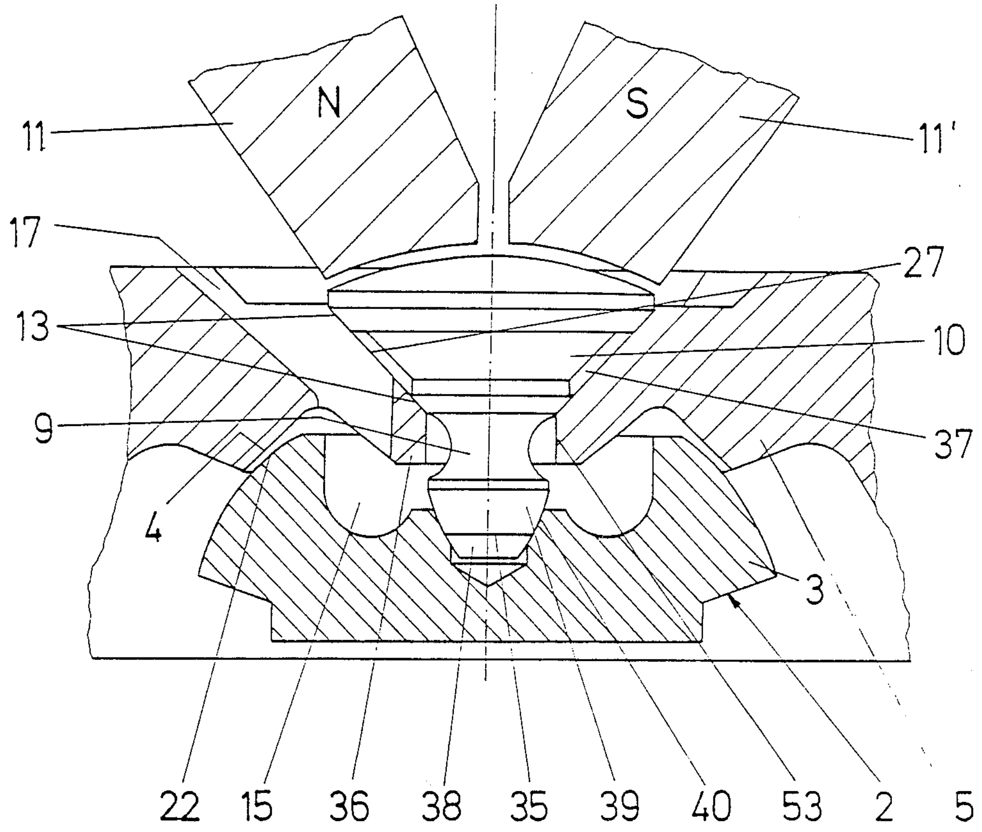
FIG. 3 shows an exemplary embodiment of a first type.

In the embodiment of FIG. 3, the two differently magnetized poles 11, 11' of the magnetic system are again located opposite the armature 10. The valve element 2 is welded to the armature 10 along the line 35. The line 35 is the section of two cones 38, 39 that dip into a conical face 40 in the valve element 2. The cones 38, 39 are joined to the actual armature 10 via a connecting part 9. Between the valve element 2 and the valve seat body 5, an annular gap 22 is formed, which blocks off the fuel when the armature is attracted upward by the poles 11, 11'. Upon opening of the gap 22 by the pressure of the fuel in the annular cross section 15, fuel metering then takes place. The directing of the fuel to the annular gap 22 takes place via the flow openings or slits 17, eight of which, for example, are machined radially into the valve seat body 5. The frustoconical bearing cone 27 in the valve seat body 5, which serves as a stop for the armature 10, has a surface length that is approximately equivalent to the mean diameter of the bearing cone 27.

An undercut 37 is also provided on the armature 10, which minimizes hydraulic adhesion and stabilizes the support. The result is radial and axial guidance of the connecting part 9 and armature 10. The stop face 13, which is short by comparison with FIG. 2, requires an additional hydraulic guide in the flow cross section 16 as well. Also, the hydraulic centering according to the examples of FIGS. 1 and 2 has such a limited increase in force as a function of deflection away from the center that ideal centering is no longer possible. This applies particularly to central injection systems, which use low pressure elements (those moving relatively large valve masses) large injection quantity. Hydraulic centering requires preliminary throttling, so that the corresponding pressure to prepare the fuel is absent.

The flow openings or slits 17 need not extend along the entire cone; instead, even with a relatively large valve body diameter, they can form a recessed encompassing ring 36 in the valve seat body 5. In that case, the slits 17 must then pierce the valve seat body 5 in the manner of holes. It should also be pointed out that the undercut 37 represents a weak point, by way of which the stroke and hence the flow can be adjusted exactly by plastic deformation, by pressing upon the connecting part 9 and armature 10.

Figure 4:
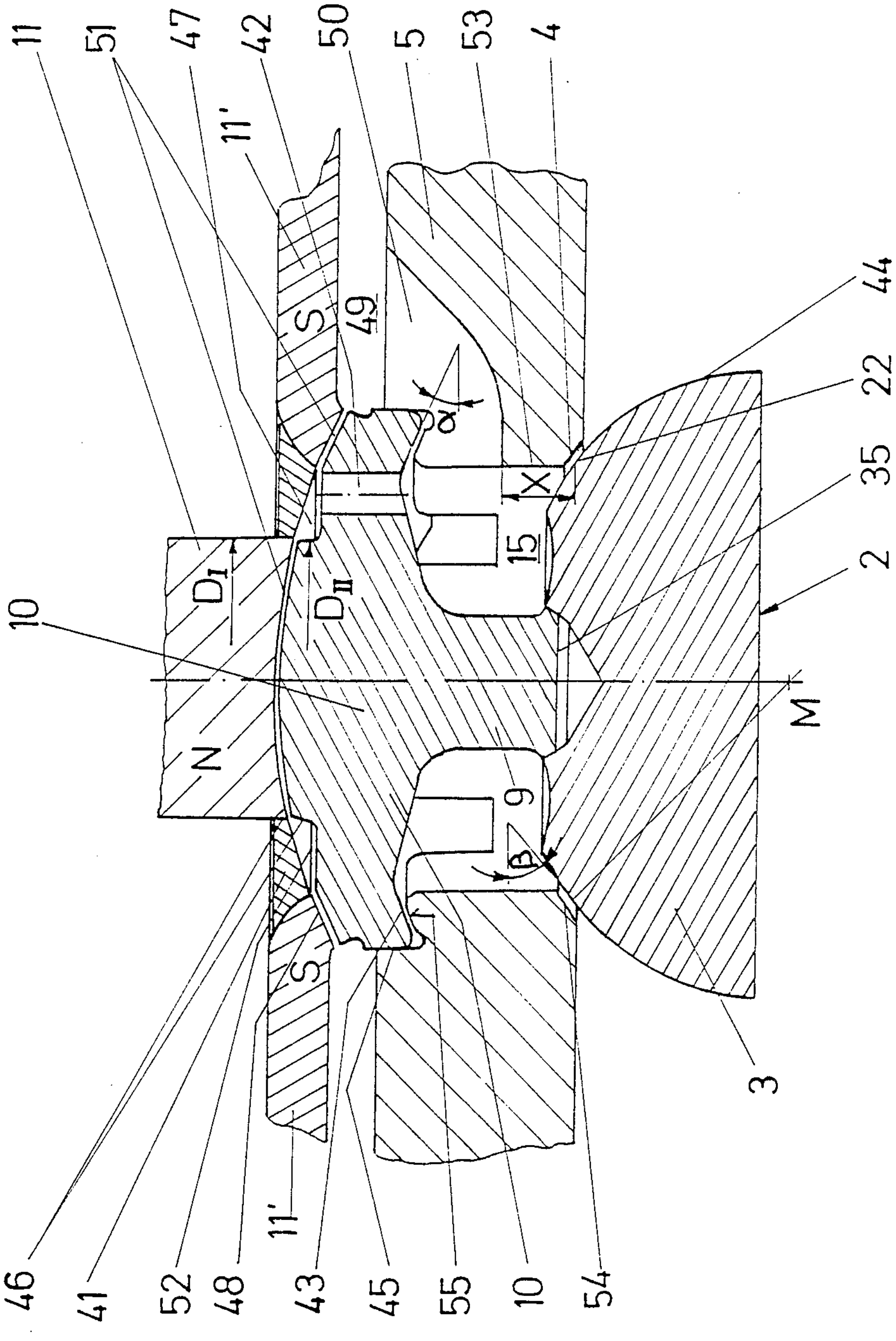
FIG. 4 shows an exemplary embodiment of a second type.

FIG. 4 shows another exemplary embodiment of the invention. The differently magnetized, rotationally symmetrical magnet poles 11, 11' exert a switchable force upon the ferromagnetic armature 10. The armature 10 can thus be attracted upward along with the nonmagnetic valve element 2 welded along the line 35 as was shown in FIG. 3, so that the fuel from the annular cross section 15 is blocked in the annular gap 22. If magnetic tension in the magnetic poles 11, 11' is absent, the armature 10 drops because of the pressure of the fuel, and the annular gap 22 opens.

The width of the annular gap 22 in this position must be precisely defined, because on the one hand the metering of the fuel, if there is no stroke throttling provided, is proportional to the stroke, and on the other hand the rotational symmetry of the injected quantity of fuel is very important, especially with the single-point valve (central injection) shown. According to the invention, the bearing faces 43 and 55 of the armature 10 and valve seat body 5 respectively are now embodied as calottes, the spherical center M of which is identical to that of the calotte face 44 on the valve element 2 and of the air gap 51. That is, if the armature 10 is displaced on the bearing face 43, then the width of the annular gap 22 does not vary, so that the injection specifications remain constant. The displacement on the bearing face 43 is limited by radial bearings 45. These radial bearings 45 may for instance be provided on the outer circumference of the bearing face 43. It may also be present at other points, such as on the inside circumference of the bearing face 43. It is also possible for the radial bearing 45 to be omitted completely, and the centering provided by superimposed edges of the magnet system may suffice. The diameters $D_I$ and $D_{II}$ are therefore the same in the region 46 of the inner pole 11. The edges are sharp, for maximum centering and maximum force. The same is true for the face 48 of the outer pole.

The two magnet poles 11, 11' are optionally joined via a sealing element 41; then, the trapped volume 47 of fuel between the armature surface and the magnet poles, because of the narrow gap at the face 48, hinders rapid armature motion. Therefore, axial pressure compensation bores 42, or slightly oblique ones for the sake of machinability, may be provided between the volume 47 and the annular cross section 15 or an inflow chamber 49. The delivery of fuel to the annular chamber 15 is effected from the inflow chamber 49 via slits 50 in the valve seat body 5.

Undercutting the welding line 35, when there is axial pressure upon the armature 10 and valve element, represents a weak point in terms of strength, so that upon being pressed, a durable plastic deformation without major return resiliency occurs for stroke compensation. The angle of the seam and the form of the surroundings are selected such that adequate pressure is superimposed upon the shearing strain to prevent rupture of the welded seam. The plane face 52 on the armature 10 serves to bring this force to bear and to provide electrical contact and vertical positioning of the armature 10 during resistance welding along the line 35.

Figure 5:
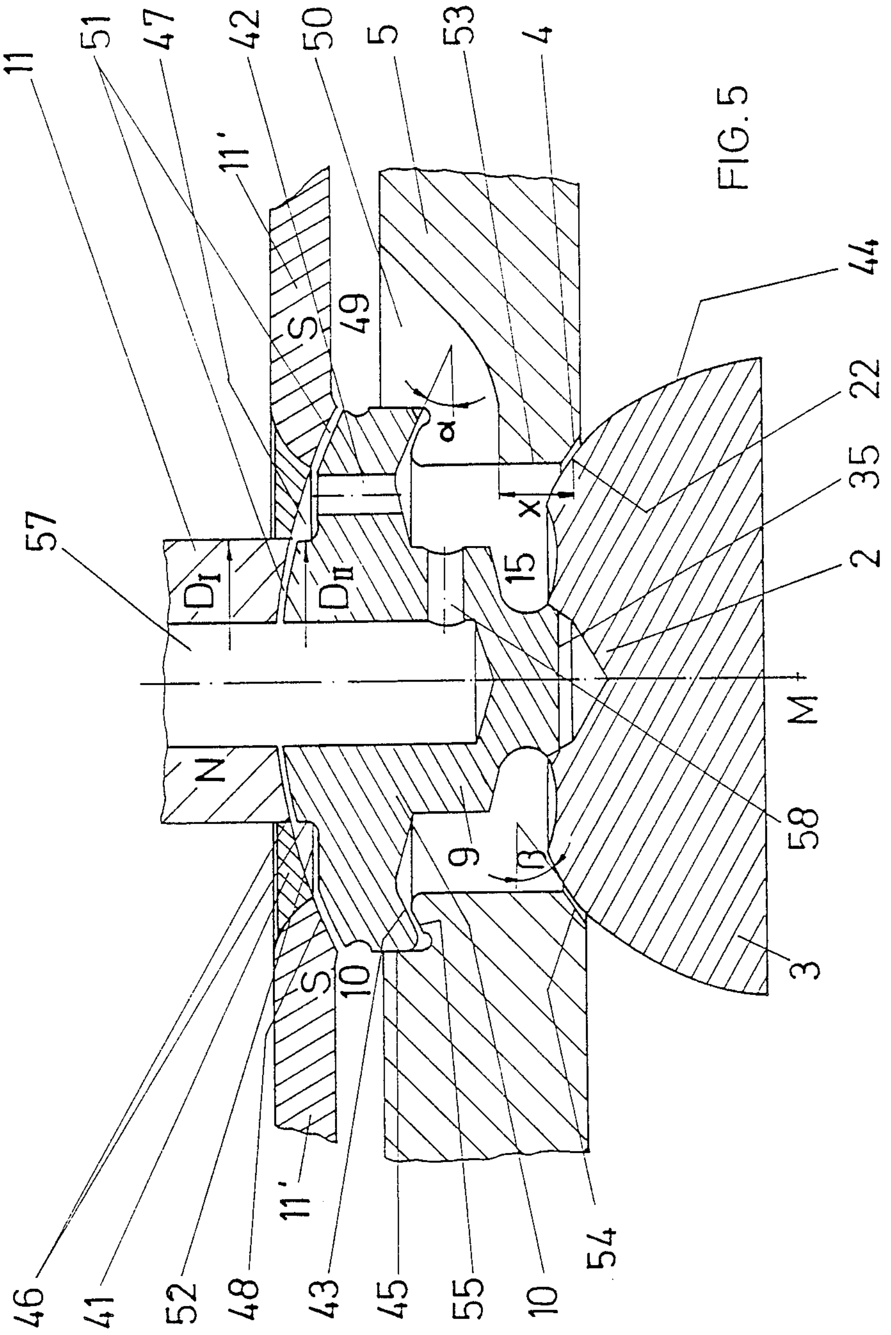
FIG. 5 shows a modification of the exemplary embodiment of FIG. 4.

FIG. 5 shows an embodiment similar to that of FIG. 4, but with central delivery of fuel at 57, which communicates via bores or slits 58 with the annular cross section 15.

The embodiment of FIGS. 4 and 5 has a number of further advantages over the embodiments of FIGS. 1–3. The bore 53 in the valve seat body 5 is enlarged, and with the larger diameter 53, the diameter of the connecting point of the armature and valve body is larger as well, which makes it easier to machine precisely. Additionally, the conical face 54 and the bearing face 55 in the form of a calotte in the valve seat body 5 can be machined from one side in the same chuck. Thus there is no eccentricity between these faces. Any contribution toward asymmetry of the fuel stream is avoided. Enlarging the bore 53 also means that it is possible to dispose more slits 50 in the valve seat body 5, resulting in more uniform fuel delivery to the annular gap 22, especially if for the sake of more favorable manufacture, such as by stamping, a minimum width is required and the total surface area of these slits is specified for the sake of the pressure drop. The greater cross section of the distributor ring with the larger bore 53 further improves the fuel distribution.

The spacing 29 between the root points of the slits 50 and the annular gap 22 is less, with the same structural height of the armature, than with the long cone shown in FIG. 3. This improves the uniform distribution of the fuel to the annular gap without requiring expensive provisions. A longer distance 29 also makes the slits 50 easier to make by stamping, because the attainable stamping depth increases with the distance 29.

With circular-symmetrical magnet systems, the more disk-like construction of the armature 10 as in FIG. 4 has the advantage, because of the shape of the bearing face, of being better adapted to magnetic requirements, because circular-symmetrical magnet systems have no magnetic flux in the middle, so that a magnet conduction cross section is not necessary there either. Instead, the disk projects farther outward, because two air gaps are present in FIG. 4 as compared with one in FIGS. 1–3, and because these air gaps should each be wider per se 15 than in FIGS. 1–3, so that the stray flux, because of the much greater length of the air gap 51, is not allowed to increase overly much compared with that of FIGS. 1–3.

The flat bearing construction of FIGS. 4 and 5 also offers a better opportunity for disposing bores, for either fuel delivery or pressure equalization. This is particularly clear with the central fuel delivery bore 57 in FIG. 5. The central fuel delivery bore 57 can be kept shorter in the construction of FIG. 4 than in FIG. 3, and as already mentioned, the larger diameter 53 makes it possible without difficulty to provide a great many bores or slits 50, from which the fuel can be carried out of the inflow chamber 49 into the annular cross section 15 without major asymmetry of the flow.

The widely projecting, flat bearing construction also makes for a relatively large diameter of the plane face 52. This allows a vertical position of the armature 10 that is insensitive to friction or dirt particles while it is being resistance-welded to the valve element 2, and during plastic deformation for adjusting the stroke. The alignment of FIG. 4 is not bound to a sliding motion within the bearing faces; the angle $\alpha$ can therefore tend arbitrarily toward zero. The larger angle $\beta$, because of the concentricity of the calottes, however, must still barely permit sliding and is thus defined. A particularly small angle $\alpha$ produces a smaller stroke error at a constant wear density of the bearing, for geometrical reasons. If the armature 10 sits slightly tilted in the seat, the widely projecting bearing produces greater aligning moment than in FIG. 3. The final position of the armature 10 of FIG. 4 is thus arrived at more quickly. A smaller angle $\alpha$ also increases the magnetic forces, and the mechanical stability and the expenses of machining are reduced.

It should also be mentioned that the center M of the calotte, in the limiting case, can be infinite, so that the spheres then merge with planes. Since in that case angle $\beta=0$, the valve element 2 is no longer centered. However, centering is unnecessary for metering reasons. With M tending to infinity, sealing is effected with faces; however, it can also be replaced by an annular bead, at least on one of these faces. If the deflection of the material of the sealing point from wear is taken into account, however, defined centering is preferred, as exists when $\beta>0$. The cleaning effect is also better defined with $\beta>0$. The center M of the calotte can theoretically also be located above the annular gap 22. Then, $\beta<0$, and centering and defined cleaning take place once again. In the embodiments of FIGS. 4 and 5, a short metering diaphragm is created, which results from a short conical counterpart face 54 in the valve seat body 5 and a long calotte face 44, which in particular overlaps it outward, on the valve element 2. Because of the Coanda effect, the fuel on the sharp-edged end of the counterpart face 54 flows on along the calotte face 44. It ruptures at the sharp-edged end of the calotte face 44 and is ejected into the air approximately at a tangent to the surface of the calotte. Because of the suction exerted on the fuel by the calotte, the fuel is deflected outward. Turbulence is produced, and thus atomization. As is well known, this effect is used for thorough mixing of air, or to form very wide injection cones.

Figure 6:
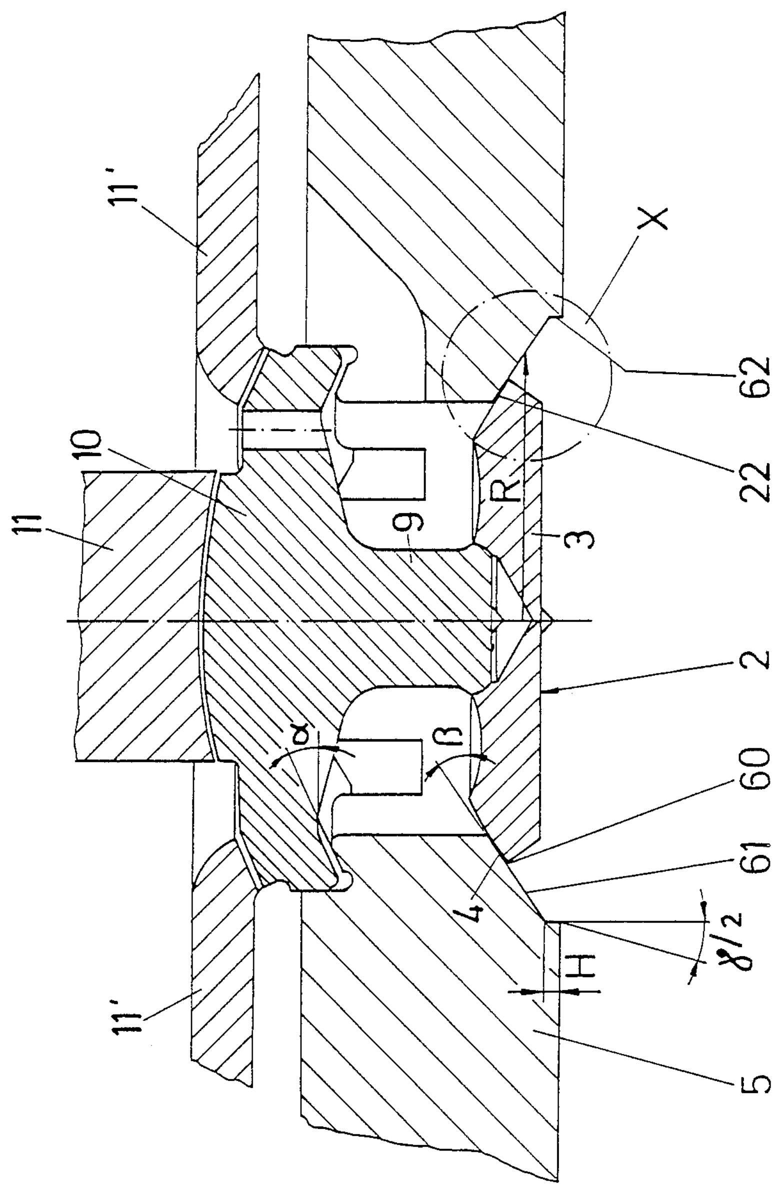
FIG. 6 shows a further exemplary embodiment.

FIG. 6 shows a further embodiment of the invention. Once the armature 10 has dropped downward because of the pressure of the fuel, or in other words the annular gap 22 has opened, the fuel flows by the rupture edge 60 of the valve element 2 along the spherical face 61 on the valve seat body 5. This suction action of the Coanda effect is used here not to divert the fuel but rather solely to fix the fuel lamina on the face 61. Depending on the increase in radius of the face 61 along the fuel path, the thickness of the lamina decreases, as desired, because the speed remains virtually constant. The fuel is radiated against an impact face 62, where a sharp deflection and fluidizing, i.e. the creation of turbulence, take place. The height H of the impact face 62 defines the angle of the injection cone; $\Gamma$ tends toward zero for H tending toward infinity. In FIG. 8, a detail X of FIG. 6 is shown, and here the possibility of an undercut 63 on the intersection line between the faces 61 and 62 is shown, in order to increase the turbulence. A further undercut 67 can serve to sharpen the rupture edge at the end of the impact face 62, and thus prevent droplets from adhering. The magnitude of the sharp deflection is determined not only by the angle $\Gamma$ but also by the angle $\beta$. A smaller or negative $\beta$ (see FIG. 7) produces a more pronounced deflection and hence smaller droplets given a defined lamina thickness. For the angle $\sigma$ of the injection wall, it may also be true that $\sigma$ is not equal to zero.

Figure 7:
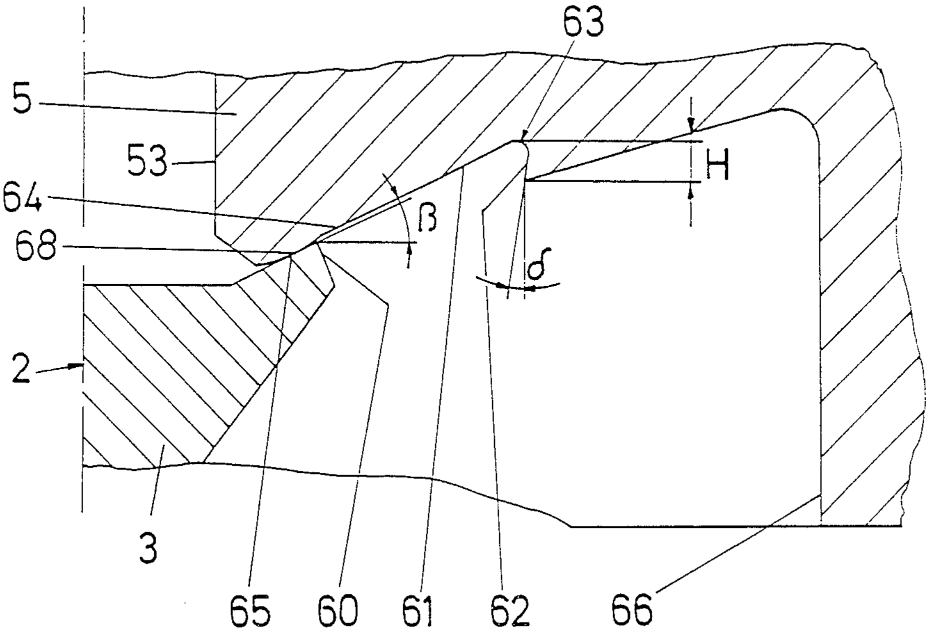
FIGS. 7–10 show details, particularly relating to the embodiment of FIG. 6.
Figure 8:
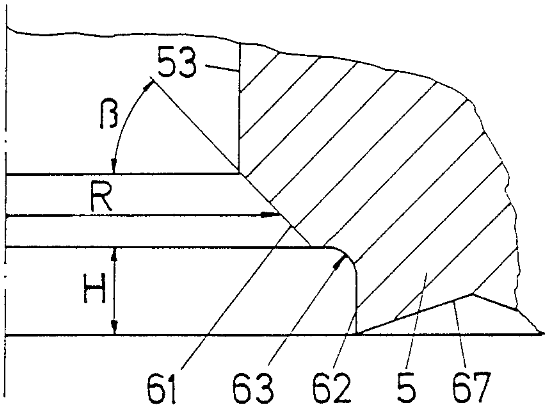

In FIG. 7, the valve seat face 68 is a calotte with the center M, which at the circumference 64 merges with an upwardly extending conical surface 61, which is adjoined, via a radius of the undercut 63, by the downwardly extending impact face 62, which steers the fuel more or less parallel to or in the direction of the longitudinal valve axis. The sealing face 65 of the valve element 2 may be embodied as a conical surface or calotte. The cylinder 66 serves to protect the elements mechanically and is embodied such that the stream of fluid does not touch this cylinder.

FIGS. 1–5 have neither impact nor spin preparation; that is, they do not have any three-dimensionally defined sharp generation of turbulence. The Coanda effect produces turbulence along the calotte surface 44 (FIG. 4); that is, along a long distance counter to the thickness of the liquid laminas. The turbulence is based on instability resulting from the suction of the calotte face 44 on the liquid lamina. If asymmetrical feeding via the slits 50 causes this lamina to be thicker in one angular region, then the suction is weakened, and additional fuel also flows into this region from neighboring regions; that is, undesirable macroscopic uneven distribution and large droplets are produced. However, the goal is always a macroscopic uniform distribution as well as microscopic uneven distribution, or in other words small droplets. Therefore, in the proposals according to FIGS. 6, 7 and 8, suction is hardly exerted along the fuel guide over the conical surface 61, and the stable flow is intended along this path to improve its macroscopic uniform distribution. The diameter increases much faster than is the case in otherwise conventional valves. The lamina along this distance on the conical surface 61 is therefore desirably thinner approximately in proportion to 1/R, or in other words on the most direct path to the small droplet size. At the impact face 62, microscopic turbulence, flow radii with comparable lamina thickness, are produced; that is, from the already thin lamina, superfine droplets are produced.

The energy of the turbulence can be heavily influenced with the angle $\beta$ opening toward the impact face 62, and a smaller angle $\beta$ increases the turbulence. The lamina, particularly for large injection angles $\Gamma$, can be made so highly turbulent that the distribution of the fuel can be influenced even within the angle $\Gamma$. Other variables influencing the angle $\Gamma$ are H, $\sigma$ and the undercut. The distribution of the droplets thus becomes a circular-symmetrical ring, the width of which can be influenced arbitrarily for practical operation by the turbulence generated. The droplet size is less than in the known Coanda preparation.

This latter embodiment has a moved mass that is structurally less in comparison with the prior art. The flatter structure of the valve body produces better stability during welding and stroke adjustment, and the critical moved element is recessed farther inside the valve and thus is less vulnerable to damage.

Figure 9:
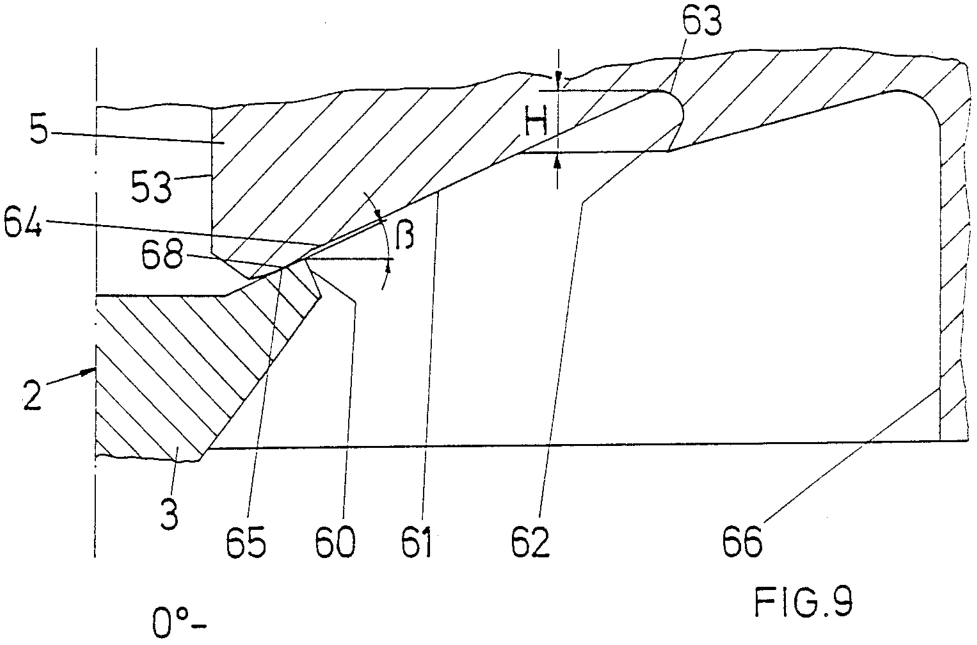
Figure 10:
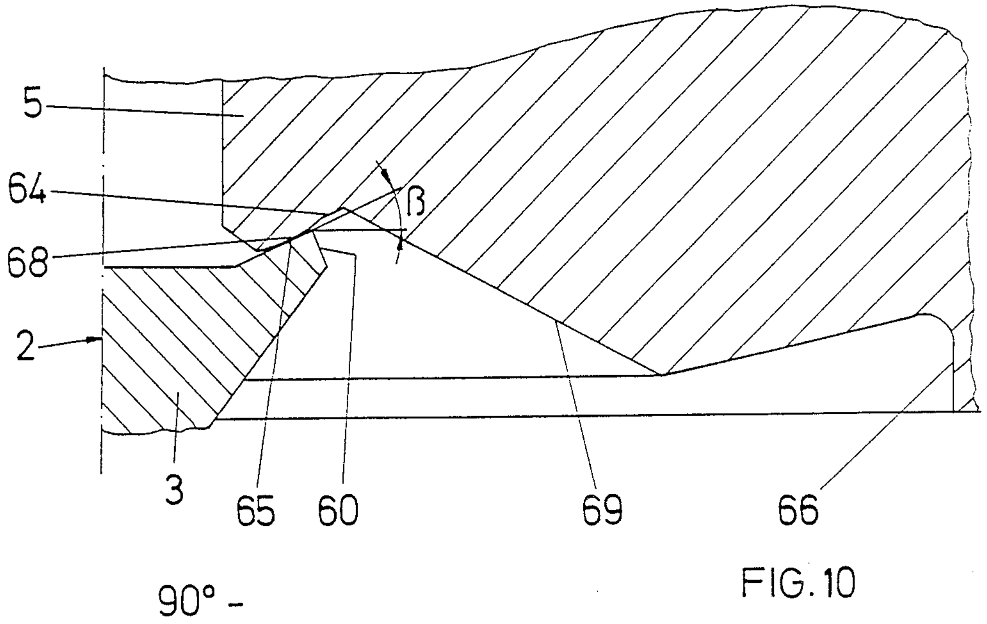

It should also be pointed out that the conical face 61 need not necessarily be part of a circular cone; for instance if with two inlet valves per engine cylinder, two fan-like streams are desired, then on the basis of FIG. 7 the valve can be embodied as shown in FIG. 9, which shows a section in the zero sectional plane. FIG. 10 shows the same valve in a 90° trifugal force and by lengthening the conical face 61, the fuel is spun onto this surface, so that the two fans that are desired are produced. In FIG. 10, the conical face 69 does not guide any fuel. It is advantageous that as a result the flow on the valve seat face 65 changes virtually not at all. As a result, the stroke and the idle volume, which vary in valves with internal metering, do not vary either.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An electromagnetically actuatable valve, in particular a fuel injection valve for fuel injection systems of internal combustion engines, having a core (11, 11') and an armature (10) of soft magnetic material arranged to actuate a valve element (2) adapted to cooperate with a fixed valve seat (4), said valve element (2) provided with a sealing element (3) movable outwardly for opening the valve, said armature (10) being connected to the valve element (2) by a connecting part (9), said connecting part (9) being arranged to protrude through a flow bore (53) of a valve seat body (5), said valve seat body (5) further having a frustoconical bearing cone (27) machined therein a length of a surface line of which is approximately equivalent to a mean diameter thereof, and said armature (10), on its side remote from the core (11, 11'), has a frustoconical surface adapted to engage a majority of a surface portion of the bearing cone.

2. A valve as defined by claim 1, in which an undercut (37) is provided in the frustoconical surface of the armature (10).

3. A valve as defined by claim 1, in which slits (17) are machined into the bearing cone (27), said slits extending over a portion of the bearing cone (27), terminate at a ring (36), and pierce the valve seat body (5).

4. A valve as defined by claim 2, in which slits (17) are machined into the bearing cone (27), said slits extending over a portion of the bearing cone (27), terminate at a ring (36), and pierce the valve seat body (5).

* * * * *